(12) United States Patent
Chatterjee et al.

(10) Patent No.: US 7,562,200 B1
(45) Date of Patent: Jul. 14, 2009

(54) METHOD, SYSTEM, APPARATUS, AND COMPUTER-READABLE MEDIUM FOR LOCKING AND SYNCHRONIZING INPUT/OUTPUT OPERATIONS IN A DATA STORAGE SYSTEM

(75) Inventors: Paresh Chatterjee, Fremont, CA (US); Srinivasa Rao Vempati, Milford, MA (US); Vijayarankan Muthirisavenugopal, Chennai (IN); Narayanan Balakrishnan, Milpitas, CA (US)

(73) Assignee: American Megatrends, Inc., Norcross, GA (US)

( * ) Notice: Subject to any disclaimer, the term of this patent is extended or adjusted under 35 U.S.C. 154(b) by 509 days.

(21) Appl. No.: 11/417,802

(22) Filed: May 4, 2006

Related U.S. Application Data

(60) Provisional application No. 60/689,587, filed on Jun. 10, 2005, provisional application No. 60/689,471, filed on Jun. 10, 2005, provisional application No. 60/689,484, filed on Jun. 10, 2005.

(51) Int. Cl.
*G06F 12/16* (2006.01)
(52) U.S. Cl. .............................. 711/163; 711/154; 707/8
(58) Field of Classification Search ....................... None
See application file for complete search history.

(56) References Cited

U.S. PATENT DOCUMENTS

| | | | |
|---|---|---|---|
| 5,974,426 | A | 10/1999 | Lee et al. |
| 2002/0161983 | A1 | 10/2002 | Milos et al. |
| 2003/0163630 | A1 | 8/2003 | Aasheim et al. |
| 2004/0068607 | A1* | 4/2004 | Narad .......................... 711/108 |
| 2007/0136385 | A1* | 6/2007 | Abrashkevich et al. ....... 707/200 |
| 2007/0233990 | A1* | 10/2007 | Kuczynski et al. ........... 711/170 |
| 2008/0168458 | A1* | 7/2008 | Fachan et al. ................ 718/104 |
| 2008/0282057 | A1* | 11/2008 | Layden et al. ............... 711/210 |

OTHER PUBLICATIONS

U.S. Appl. No. 11/254,347, filed Oct. 20, 2005, entitled "Method, System, Apparatus, And Computer-Readable Medium for Provisioning Space in a Data Storage System," Inventors: Chatterjee et al.

(Continued)

*Primary Examiner*—Jack A Lane
(74) *Attorney, Agent, or Firm*—Hope Baldauff Hartman, LLC

(57) ABSTRACT

A method, system, apparatus, and computer-readable medium are provided for synchronizing I/O operations in a computer system. According to aspects of the invention, multiple reader and writer locks are provided that may be acquired by calling processes at two different granularities. Locks may be acquired for an area of storage equivalent to the logical unit of allocation or for a sub-provision area equivalent to a unit of snapshot read-modify-write. Each lock is represented by a lock data structure that represents the same amount of logical address space as the logical unit of allocation. A request that arrives to the lock data structure is made to wait in a lock wait queue until the request can be honored. Requests that have been honored but that have not yet released the lock are maintained in a dispatch queue. When a writer lock is assigned to a lock request, no other readers or writers may be allocated to it. When a reader lock is assigned to a lock request, the lock may also be given to other readers, but not to a writer. A round robin technique is utilized to respond to requests for locks so that one lock does not starve the other locks.

33 Claims, 14 Drawing Sheets

OTHER PUBLICATIONS

U.S. Official Action dated Sep. 4, 2007 in U.S. Appl. No. 11/254,347.
U.S. Official Action dated Mar. 18, 2008 in U.S. Appl. No. 11/254,347.
U.S. Official Action dated Oct. 8, 2008 in U.S. Appl. No. 11/254,347.
U.S. Notice of Allowance / Allowability dated Jan. 12, 2009 in U.S. Appl. No. 11/254,347.

* cited by examiner

| PROVISION NUMBER | SEQUENCE NUMBER | NEW WRITES BITMAP | DOWN POINTER | |
|---|---|---|---|---|
| 14 | 0 | | PROV 32 | ← 102A |
| 32 | 16 | | PROV 8 | ← 102B |
| 8 | 14 | | PROV 17 | ← 102C |
| 17 | 12 | | PROV 22 | ← 102D |
| 22 | 8 | | PROV 11 | ← 102E |
| 11 | 6 | | PROV 22 | ← 102F |
| 22 | 2 | | NULL | ← 102G |

Fig. 8

METHOD, SYSTEM, APPARATUS, AND COMPUTER-READABLE MEDIUM FOR LOCKING AND SYNCHRONIZING INPUT/OUTPUT OPERATIONS IN A DATA STORAGE SYSTEM

CROSS-REFERENCE TO RELATED APPLICATIONS

This application claims the benefit of U.S. provisional patent application No. 60/689,587, filed on Jun. 10, 2005, U.S. provisional patent application No. 60/689,471, filed on Jun. 10, 2005, and U.S. provisional patent application No. 60/689,484, also filed on Jun. 10, 2005, each of which are expressly incorporated herein by reference in their entirety.

TECHNICAL FIELD

The present invention is related to the field of computer data storage systems. More particularly, the present invention is related to the field of locking and synchronizing input/output operations in a data storage system.

BACKGROUND OF THE INVENTION

For a variety of reasons, it is possible for data corruption to occur in data storage systems that have support for more than one concurrent I/O operation and that do not synchronize or lock the I/O operations. Generally, this is possible because each I/O operation looks up, and optionally modifies, metadata that may also be used by other, parallel I/O operations. One type of data storage system that is particularly vulnerable to data corruption as the result of unsynchronized parallel I/O operations is a data storage system that utilizes snapshots. A snapshot is a read-only volume that is a point-in-time image of a data storage volume that can be created, mounted, deleted, and rolled back onto the data storage volume arbitrarily. Snapshots are utilized extensively in the data storage industry for security, backup, and archival purposes. Snapshots may also be utilized within data storage systems that utilize thin provisioning to allocate storage space on demand. Space is allocated in units of a provision, while snapshot writes occur in sub-provision units referred to herein as "chunks."

In a data storage system with active snapshots, a particular chunk may receive two concurrent non-overlapping sub-chunk writes. If the chunk has not received any I/O requests in the current snapshot lifetime but has previously received I/O requests, it is necessary to perform a read-modify-write cycle for the first write. If no synchronization mechanism is present, both sub-chunk I/Os will start independent read-modify-write cycles, unaware that another I/O operation is operating on the same chunk. As a result, both operations will be converted to inconsistent chunk writes, one of which will overwrite the other. This will lead to data corruption.

I/O operations that are not synchronized may also cause corruption to the metadata of a system that utilizes snapshots. In particular, data storage systems that utilize snapshots typically utilized metadata to indicate the particular lifetime that a chunk was written in. If a certain chunk receives a read operation and a write operation in parallel on two non-overlapping sub-chunk writes, and the write is the first new write to the chunk, and the chunk contains valid data from a previous snapshot lifetime, the read operation may be performed on the wrong provision. This is because when the write is dispatched, a bit in the metadata will be set just prior to the write being completed. If the mapping cycle of the read operation takes place before the bit is set, the new provision will be resolved instead of the old one. However, since the read-modify-write cycle has not yet been completed, the read from the new provision will yield the wrong data, resulting in apparent data corruption. If, alternately, the metadata bit that indicates that a new write has taken place is set only after the write has been completed, other problems may occur. In this case, two write operations to different chunks in the same provision may initiate writes of the metadata with different bits set, without synchronizing the setting of the metadata bits. This, also, yields data corruption.

Background processes may cause data corruption where I/O operations are not synchronized. For instance, a defragmentation thread running as a background process can also cause data corruption. If a background defragmentation read operation and a write operation to the same chunk are dispatched together and the defragmentation read completes first, the defragmented data will become out of date, thereby causing data corruption.

It is with respect to these considerations and others that the present invention has been made.

SUMMARY OF THE INVENTION

In accordance with the present invention, the above and other problems are solved by a method, system, apparatus, data structure, and computer-readable medium for synchronizing and locking I/O operations in a computer system. Through the embodiments of the invention, I/O operations are synchronized using a lock data structure that includes reader and writer locks. The reader and writer locks are allocated only when needed and with the minimum granularity. This allows I/O operations to be synchronized, thereby eliminating the possibility of data corruption without imposing a significant performance penalty.

According to one aspect of the invention, multiple reader and writer locks are provided that may be acquired by calling processes at two different granularities. A reader lock is acquired for a process that performs an I/O operation that does not cause any change in meta-data associated with it, such as reads and non-snapshot writes. A writer lock is acquired by a process that performs an I/O operation which changes the meta-data associated with it, such as snapshot writes and defragmentation. Locks may be acquired for an area of storage equivalent to the logical unit of allocation (referred to herein as a "provision lock") or for a sub-provision area equivalent to a unit of snapshot read-modify-write (referred to herein as a "sub-provision lock" or a "chunk lock").

Each lock is represented within a data structure, called a lock data structure, that represents the same amount of logical address space as the logical unit of allocation, called a provision. The lock data structure is reusable and, at any given time, there are far fewer lock data structures in memory than there are logical units of allocation. A request that arrives to the lock data structure is made to wait in a lock wait queue until the request can be honored. Requests that have been honored but that have not yet released the lock are maintained in a dispatch queue. When a writer lock is assigned to a lock request, no other readers or writers may be allocated to it. When a reader lock is assigned to a lock request, the lock may also be given to other readers, but not to a writer. A round robin technique is utilized to respond to requests for locks, so that one lock does not starve the other locks.

According to other aspects of the invention, a lock data structure is provided for synchronizing I/O requests. The lock data structure corresponds to a unit of storage allocation in a computer system. The lock data structure includes a first wait head corresponding to the entire unit of storage allocation and one or more second wait heads corresponding to unique sub-portions of the unit of allocation. The lock data structure also includes a first dispatch head corresponding to the entire unit of allocation and one or more second dispatch heads corresponding to each of the unique sub-portions of the unit of allocation.

According to aspects, a request to perform an I/O operation is received in the form of a lock context data structure. The lock context data structure includes an identification of the provision and sub-provision against which the I/O operation is to be performed, an indication as to whether a reader lock or a writer lock is requested, and a callback mechanism, such as a callback function and a context pointer, for notifying a requesting process that a lock has been granted for the desired I/O operation. When a request is received for a lock, the lock context data structure is added to the appropriate wait head if other requests are waiting to obtain the lock. For instance, if the request is for a provision level lock, the lock context data structure is added to the first wait head if other requests are waiting. If the request is for a sub-provision level lock and other requests are waiting, the lock context data structure is added to the wait head that corresponds to the requested sub-provision portion. In this manner, provision level and sub-provision level wait queues are created that identify the requests that are waiting to obtain a lock by adding the lock context data structures to the appropriate wait head.

When a request can be granted to a waiting context, the lock context data structure is moved from the wait head to the corresponding dispatch head. For instance, if a sub-provision request can be granted, the lock context data structure on the corresponding wait head is moved to the corresponding dispatch head. Placing a request on a dispatch head indicates that the corresponding lock has been obtained but not yet released. When the process releases the lock, the lock context data structure is removed from the dispatch head. For instance, when the lock corresponding to an entire provision is granted, the lock context data structure is moved from the first wait head to the first dispatch head. When the provision level lock is released, the context data structure is removed from the provision level dispatch head. In the same manner, lock context data structures may be added to the wait and dispatch heads that correspond to the sub-portions of a provision.

According to other aspects of the invention, a pool of lock data structures may be maintained. When a request is received for a lock, a lock data structure may be allocated to the requested provision utilizing a hash function. When all of the locks for a given lock data structure have been released, the lock data structure is returned to the pool. In this manner, locks can be established for all of the provisions in a data storage system utilizing a number of data structures significantly less than the total number of available provisions.

According to another aspect of the invention, a method is provided for synchronizing I/O operations in a computer system. According to the method, a lock data structure is maintained that corresponds to a provision of the data storage capacity of the computer system. The lock data structure includes a provision level wait head that points to any requests waiting for a provision level lock, and one or more sub-provision level locks that point to any requests waiting for a sub-provision level lock. The lock data structure also includes a provision level dispatch head that points to any requests that have acquired but not yet released a provision level lock, and one or more sub-provision level dispatch heads that point to any requests that have acquired but not yet released a corresponding sub-provision level lock. According to embodiments, the provision level lock corresponds to a unit of storage allocation in the computer system, while the sub-provision level locks correspond to a unit of snapshot read-modify-write.

According to other aspects of the method, a request is received for a provision level lock. In response to such a request, a determination is made as to whether the provision level wait head is pointing to any waiting requests. If so, the request is added to the provision level wait head. In this manner, a provision level wait queue is created of the requests waiting for the provision level lock. A request may be similarly received for a sub-provision level lock. In response to such a request, a determination is made as to whether the requested sub-provision level wait head is pointing to any requests. If so, the request is added to the corresponding sub-provision level wait head, thereby creating a queue of requests for the sub-provision level lock.

If the provision level wait head or the requested sub-provision level wait head are not pointing to any waiting requests, a determination is made as to whether the requested lock is a reader or writer lock. If the requested lock is a reader lock, a determination is made as to whether any requests are pointed to by the corresponding dispatch head. If no requests are pointed to by the corresponding dispatch head, the reader lock is granted to the requestor by adding the request to the corresponding dispatch head. If requests are pointed to by the corresponding dispatch head, a further determination is made as to whether all of the requests in dispatch are readers. If so, the request is added to the appropriate dispatch head. If not, the request is added to the wait head. If the request is for a writer lock, a determination is made as to whether any requests are pointed to by any dispatch head. If so, the request for the writer lock is added to the wait head for the request. If not, the request for the writer lock is granted by adding the request to the dispatch head for the requested lock.

According to other aspects of the invention, a pool of lock data structures may be maintained. When a request is received to obtain a lock for a provision or sub-provision, a lock is allocated from the pool if one has not been previously allocated. The lock data structure is associated with the virtual provision number of the requested provision utilizing a hash function. When all of the provision level locks or sub-provision level locks in a lock data structure have been released, the lock data structure is returned to the pool. According to other aspects, I/O requests may be satisfied using a round-robin procedure and requests for the provision level lock may be prioritized.

The above-described aspects of the invention may also be implemented as a computer-controlled apparatus, a computer process, a computing system, an apparatus, a data structure, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 8 is a data structure diagram illustrating a territory diagram comprising a linked list of system table entries utilized in embodiments of the invention;

DETAILED DESCRIPTION OF THE INVENTION

Figure 1:
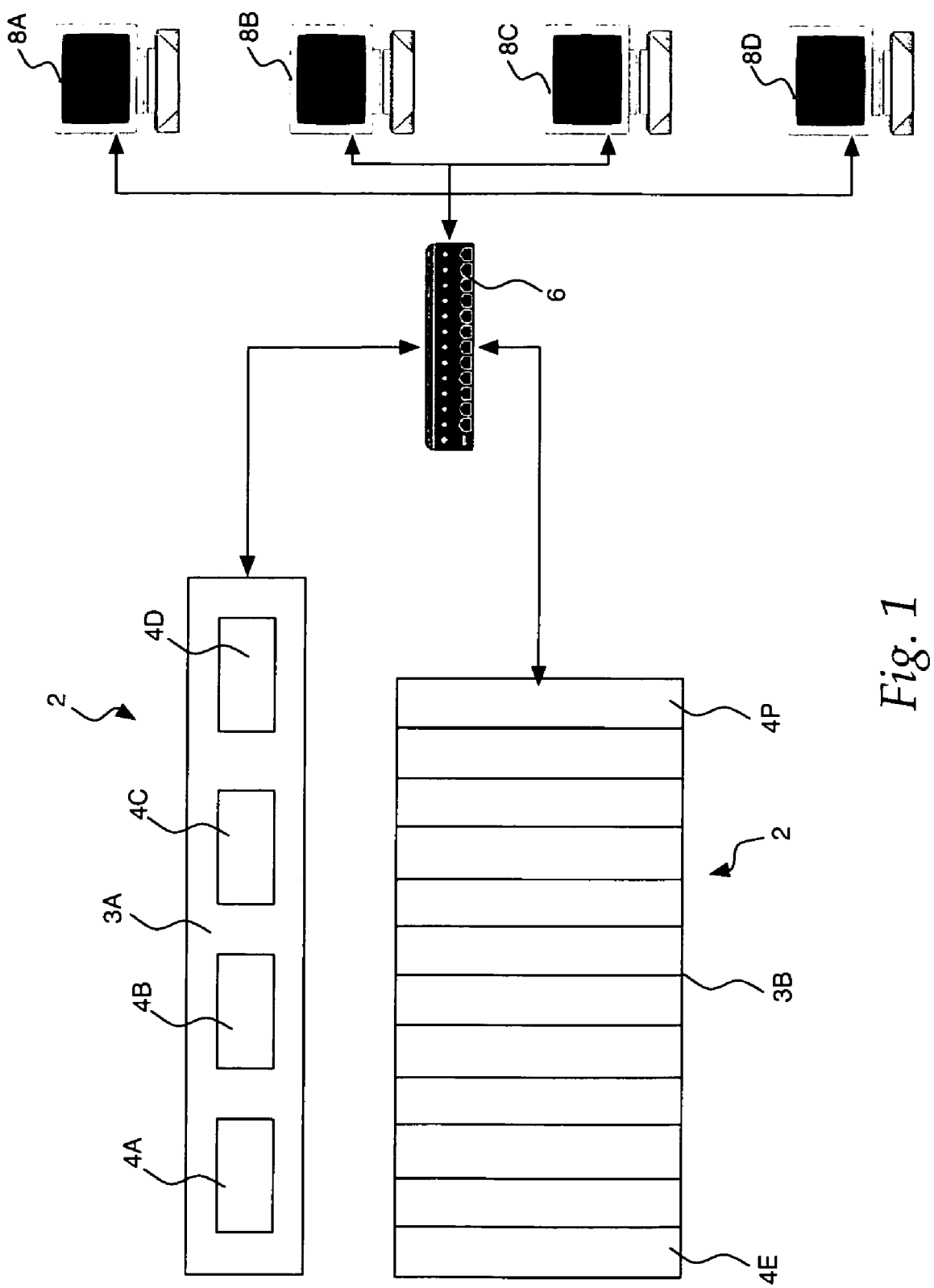
FIG. 1 is a computer architecture diagram showing aspects of a computer network utilized as an illustrative operating environment for the various embodiments of the invention.

Embodiments of the present invention provide a method, system, apparatus, data structure, and computer-readable medium for synchronizing and locking I/O operations in a computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
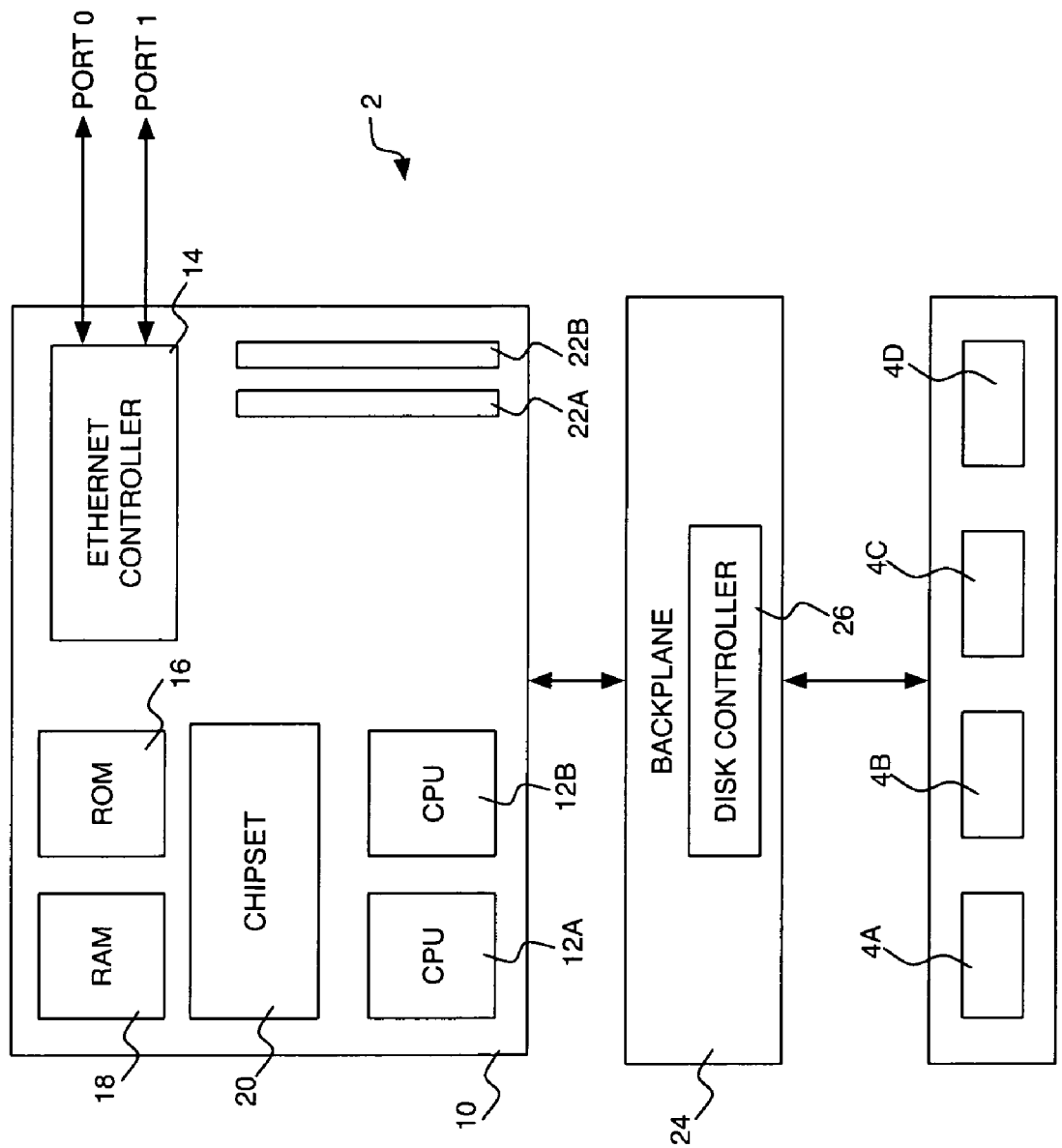
FIG. 2 is a computer architecture and network diagram illustrating aspects of a storage server computer provided by the various embodiments of the invention.
Figure 3:
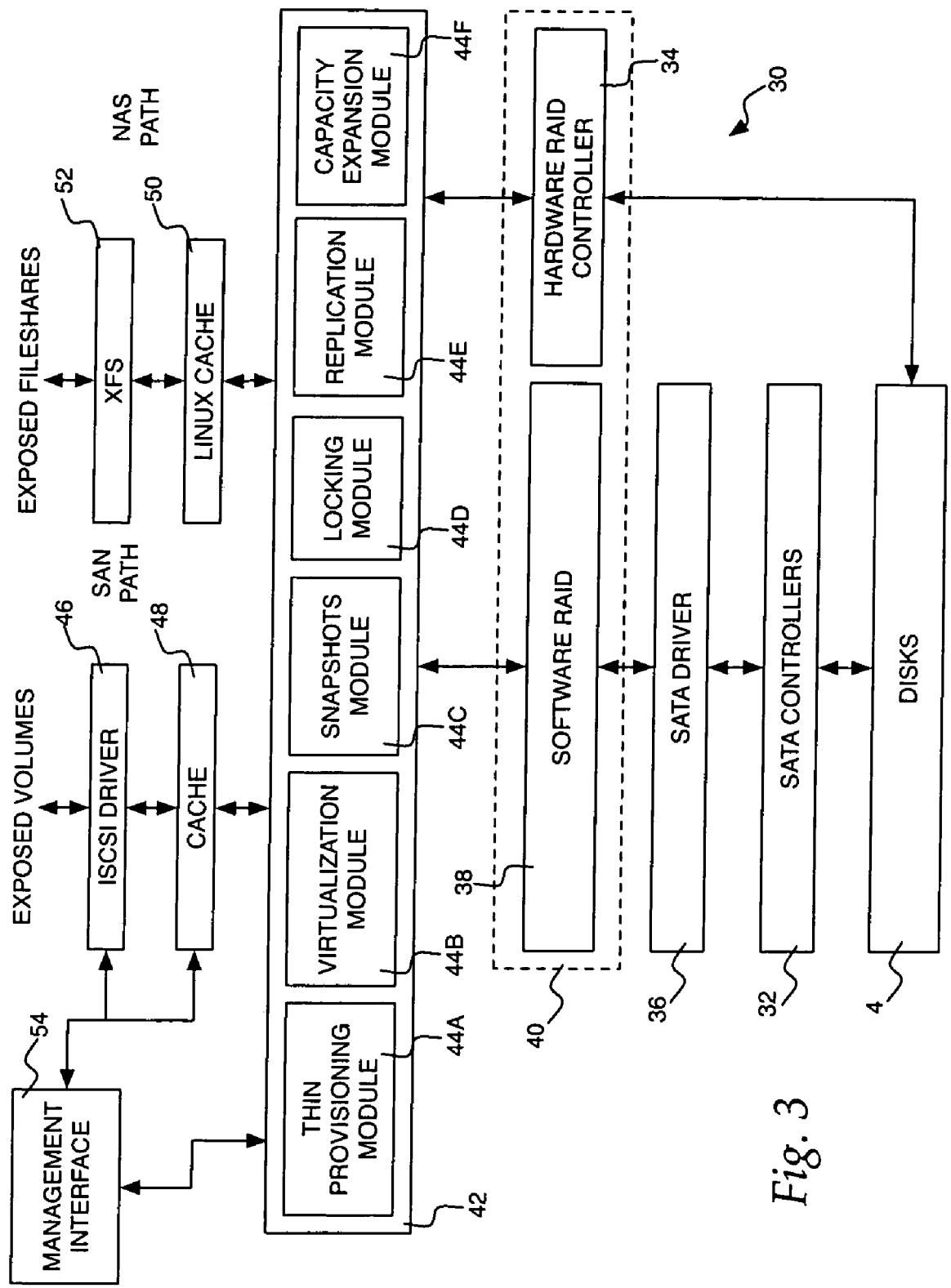
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage device, such as a hard disk drive. According to embodiments of the invention, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 2 or may be connected to the storage server computer 2 via a distributed wide area network, such as the Internet. An appropriate protocol, such as the Internet Small Computer Systems Interface ("iSCSI") protocol may be utilized to enable the initiators 8A-8D to communicate with and utilize the various functions of the storage server computer 2 over a wide area network such as the Internet.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein, such as thin provisioning and snapshots, may also be provided by the storage server computer 2. As will be described in greater detail herein, the server computer 2 is operation to synchronize I/O requests received from the initiators 8A-8D.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. It is also contemplated that the storage server computer 2 may include other components that are not explicitly shown in FIG. 2 or may include fewer components than illustrated in FIG. 2.

As described briefly above, the motherboard 2 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 18 and a ROM 16. The ROM 16 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a kernel module 42 that implements the functions described herein. In particular, the kernel module 42 may provide functionality for implementing thin provisioning, virtualization, snapshots, locking, replication, and capacity expansion. These features are implemented by the modules 44A-44F, respectively, and are described in greater detail herein. In particular, the thin provisioning module 44A provides the functionality described herein for allocating physical capacity to logical volumes on an as-needed basis. Additional details regarding the operation of the thin provisioning module 44A are provided below with respect to FIGS. 4-7. The virtualization module 44B provides functionality for creating virtual tape libraries. The snapshots module 44C provides functionality for creating, utilizing, and managing point in time snapshots of the contents of logical storage volumes. Additional details regarding the aspects of the invention for taking and managing snapshots are provided below with respect to FIGS. 8-19. The replication module 44E provides functionality for replication within the computer 2. The capacity expansion module 44F provides functionality for adding storage capacity to the computer 2. As will be described in greater detail below, the locking module 44D provides functionality for synchronizing input/output operations in a computer system that utilizes snapshots and thin provisioning. Additional details regarding the use and operation of the locking module 44D will be provided below with respect to FIGS. 9-13.

Above the kernel module 42, a number of software components are utilized depending upon the access mechanism utilized to access the data stored on the hard disk drives 4. In particular, a Storage Area Network ("SAN") path is provided that utilizes a cache 48 and a Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the kernel module 42 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash.

According to embodiments of the invention, a management interface 54 may also be provided for controlling and monitoring the various aspects of the present invention. The management interface communicates with the various layers through software interfaces to retrieve performance data, provide configuration data, and to perform other functions.

Figure 4:
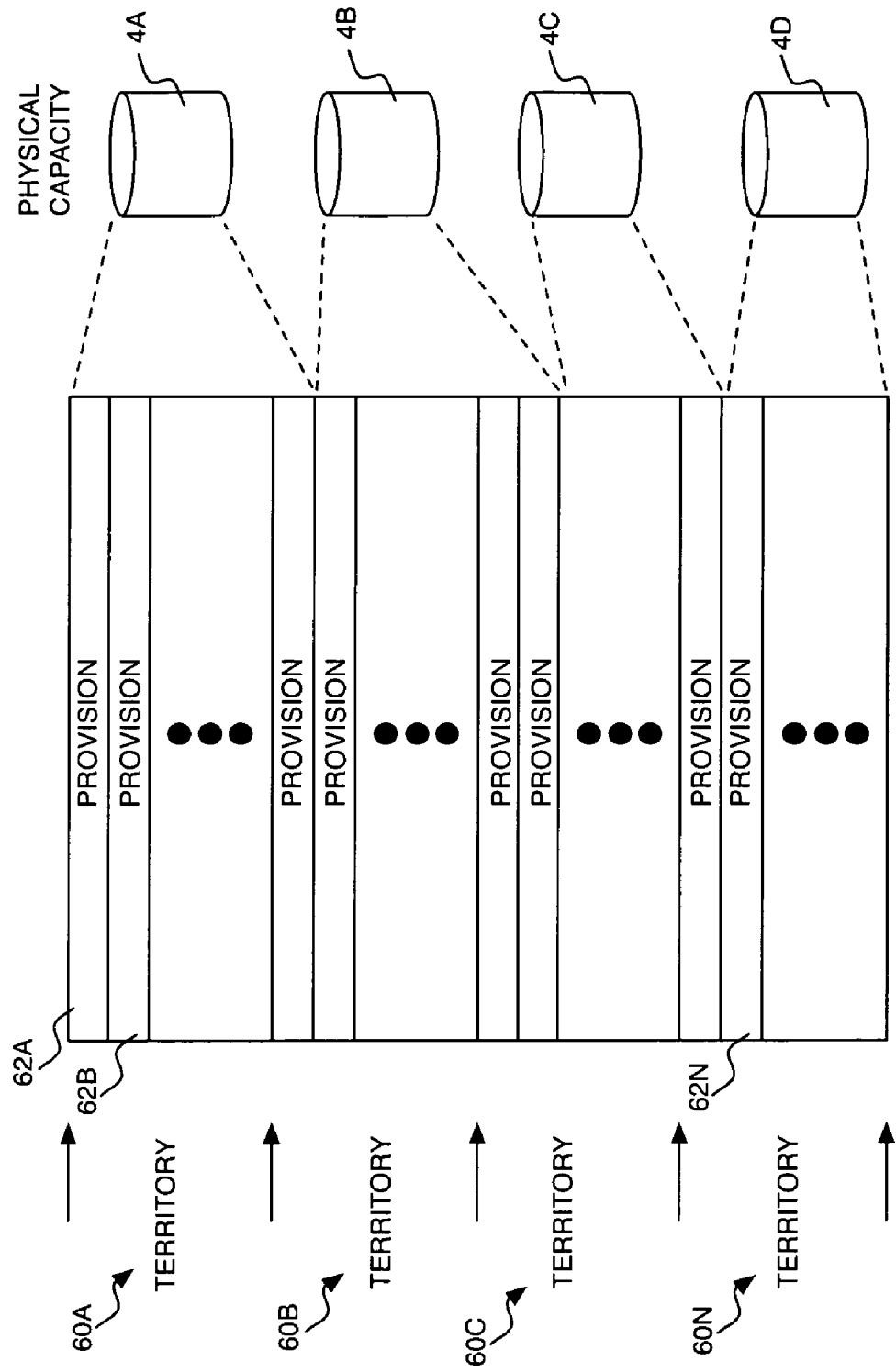
FIG. 4 is a block diagram illustrating a process for dividing the physical capacity of a data storage server computer into provisions and territories according to aspects of the invention.

Referring now to FIG. 4, additional details regarding the division of the physical capacity of the computer 2 into provisions 62A-62N and territories 60A-60N will be provided. As shown in FIG. 4, the available physical capacity of the computer 2 is made up of a number of hard disk drives 4A-4D. It should be appreciated that other computer nodes connected to the computer 2 may also contribute physical capacity to the available physical capacity of the computer 2. As also shown in FIG. 4, the available physical capacity is divided into a number of unique, equally sized areas, called territories 60A-60N. As will be described in greater detail herein, physical space is provisioned when new write operations are received in areas having the size of a territory. Additionally, physical space is also allocated for snapshots when a new write arrives for a logical provision that was allocated and written to during a previous snapshot lifetime. According to embodiments, the preferred size of a territory is one gigabyte ("GB"). However, it should be appreciated that territories of other sizes may be utilized.

As also shown in FIG. 4, the available physical capacity is further subdivided into units referred to herein as provisions 62A-62N. The provisions 62A-62N comprise unique, equally sized areas of the available physical capacity and are smaller in size than the territories 60A-60N. In particular, according to a preferred embodiment, the provisions 62A-62N are each one megabyte ("MB") in size. Accordingly, each territory includes one thousand and twenty-four provisions. It should be appreciated that provisions of other sizes may also be utilized.

It should also be appreciated that by subdividing the available physical capacity of the computer 2 into areas of different sizes, the territories and provisions, the physical capacity may be provisioned in units of different sizes when appropriate. For instance, as will be described in greater detail below, capacity may be provisioned in units of territories in response to new writes being received at a logical volume. Capacity may be allocated in units of provisions when snapshots are being utilized by the computer 2. A storage snapshot is a read-only volume that is a point-in-time image of a volume, and can be created, mounted, deleted, and rolled back onto the volume arbitrarily. When a snapshot is taken, and a new write arrives at a logical location in the volume at which data was already written before the snapshot, physical space is needed to store the new data. The space allocated for the snapshot is allocated in units of provisions. According to embodiments of the invention, space may be allocated for snapshots, if needed, up to half of the limit of the total available physical space. Other limits may be utilized similarly. Additional details regarding the allocation of physical space in territories and provisions and the taking and managing of snapshots are provided below.

Figure 5:
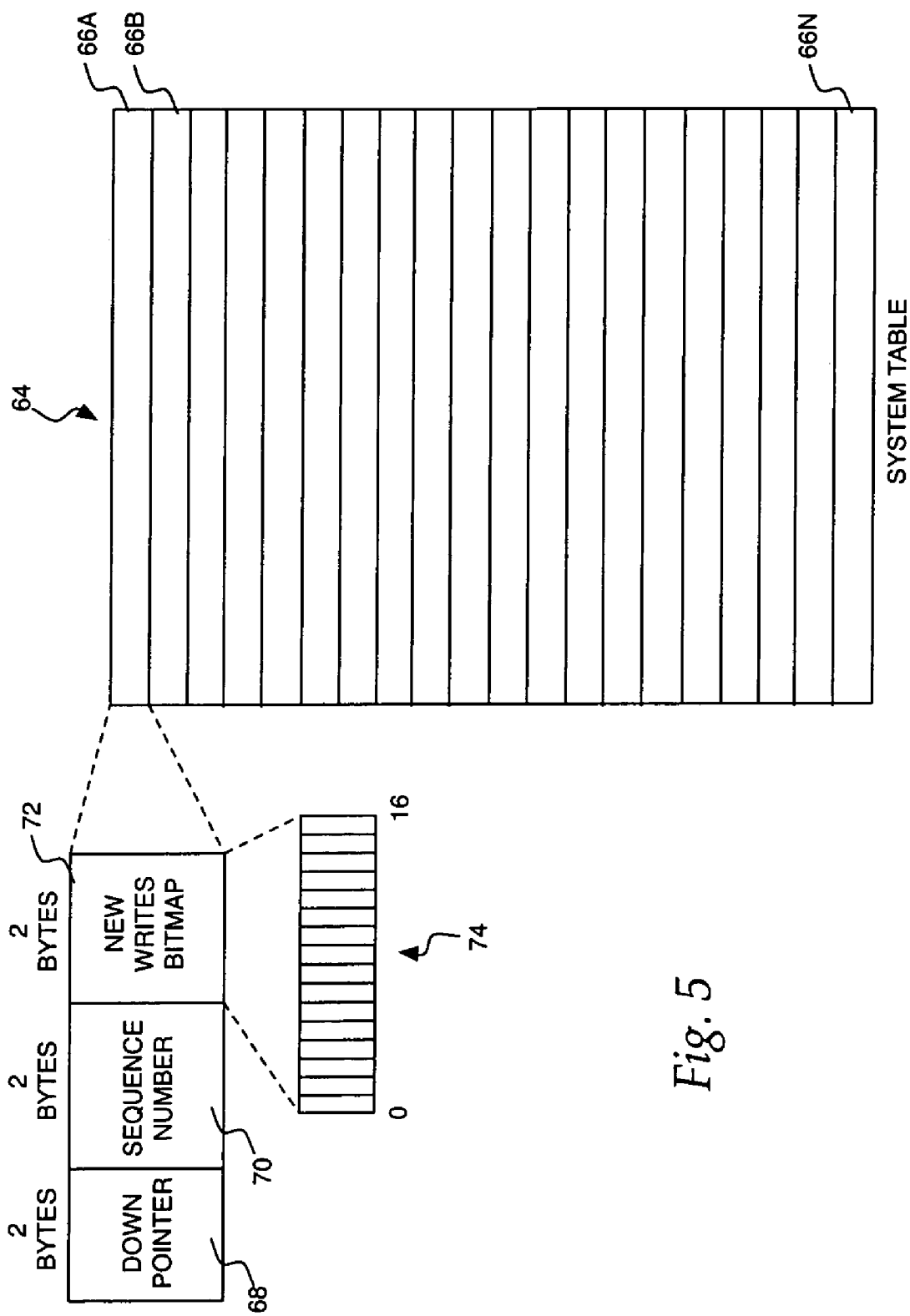
FIGS. 5-7 are data structure diagrams illustrating aspects of a system table data structure, a volume table data structure, and a provision table data structure provided by embodiments of the invention, respectively.

Turning now to FIG. 5, additional details regarding the structure and use of a system table data structure provided by embodiments of the invention will be described. In particular, FIG. 5 illustrates a system table 64 provided by and utilized in the embodiments of the invention. The system table 64 includes a number of entries 66A-66N, each of which is mapped to a unique portion of the available physical storage of the computer 2. If additional physical storage is made available to the computer 2, then additional entries may be added to the system table 64 that correspond to portions of the newly added storage. According to embodiments, each of the entries 66A-66N in the system table 64 corresponds to a provision within the available physical storage space of the computer 2.

As also shown in FIG. 5, each entry 66A-66N in the system table 64 contains a number of data fields. In particular, each entry includes a down pointer field 68, a sequence number field 70, and a new writes bitmap field 72. Each of the fields in the system table is utilized when the computer 2 is utilized to not only provide as needed allocation of physical storage space, but also to provide snapshots. In particular, the sequence number field 70 is utilized to specify the snapshot lifetime that a particular provision is allocated in. According to embodiments of the invention, certain sequence numbers are allocated for read-only snapshots and certain sequence numbers are allocated for writable snapshots. For instance, even sequence numbers may be reserved for read-only snapshots while odd sequence numbers are reserved for writable snapshots. The writable snapshot has a sequence number that is one greater than its corresponding read-only snapshot. Allocation of sequence numbers in this manner allows writable snapshots to easily be created, mounted, and rolled back onto a volume.

The down pointer field 68 is utilized to store a pointer to another entry in the system table 64 that identifies the next physical provision belonging to the same volume and with the same logical provision number. As described in greater detail below with respect to FIG. 8, the field 68 is utilized to create a linked list of system table entries from which the data for any provision during any snapshot lifetime can be stored and recreated. The new writes bitmap field 72 is utilized to store a bitmap 74 that indicates whether each chunk of the provision is valid or whether newer data exists for the chunk in another provision. According to embodiments of the invention, a chunk comprises a $\frac{1}{16}^{th}$ portion of the provision. For a 1MB provision, therefore, a chunk comprises a 64 kilobyte ("kB") area. It should be appreciated that the provisions may be divided into chunks of different sizes and that more or fewer bits may be utilized in the bitmap 74 to indicate the portions of a provision that contain valid data for a snapshot lifetime.

In this manner, the system table 64 provides information regarding each provision in the computer 2.

The system table 64 is maintained by the computer 2 and stored in the RAM 18 of the computer 2 for fast access. However, it should be appreciated that, according to embodiments of the invention, the entire system table 64 may not be stored in the RAM 18 at one time. In particular, because only the entries of the system table 64 that correspond to allocated portions of the physical storage space are valid, the entire system table 64 is not stored in the RAM 18 all the time. Rather, the system table 64 is allocated territory by territory as described herein, and can therefore be stored in the RAM 18 of the computer 2 as an array of pointers to system table segments, each of which contains the system table for the provisions within a single territory. The volume table data structures described below may be stored in a similar manner. Other methods for storing the system table 64 and the volume tables described below will be apparent to those skilled in the art.

Figure 6:
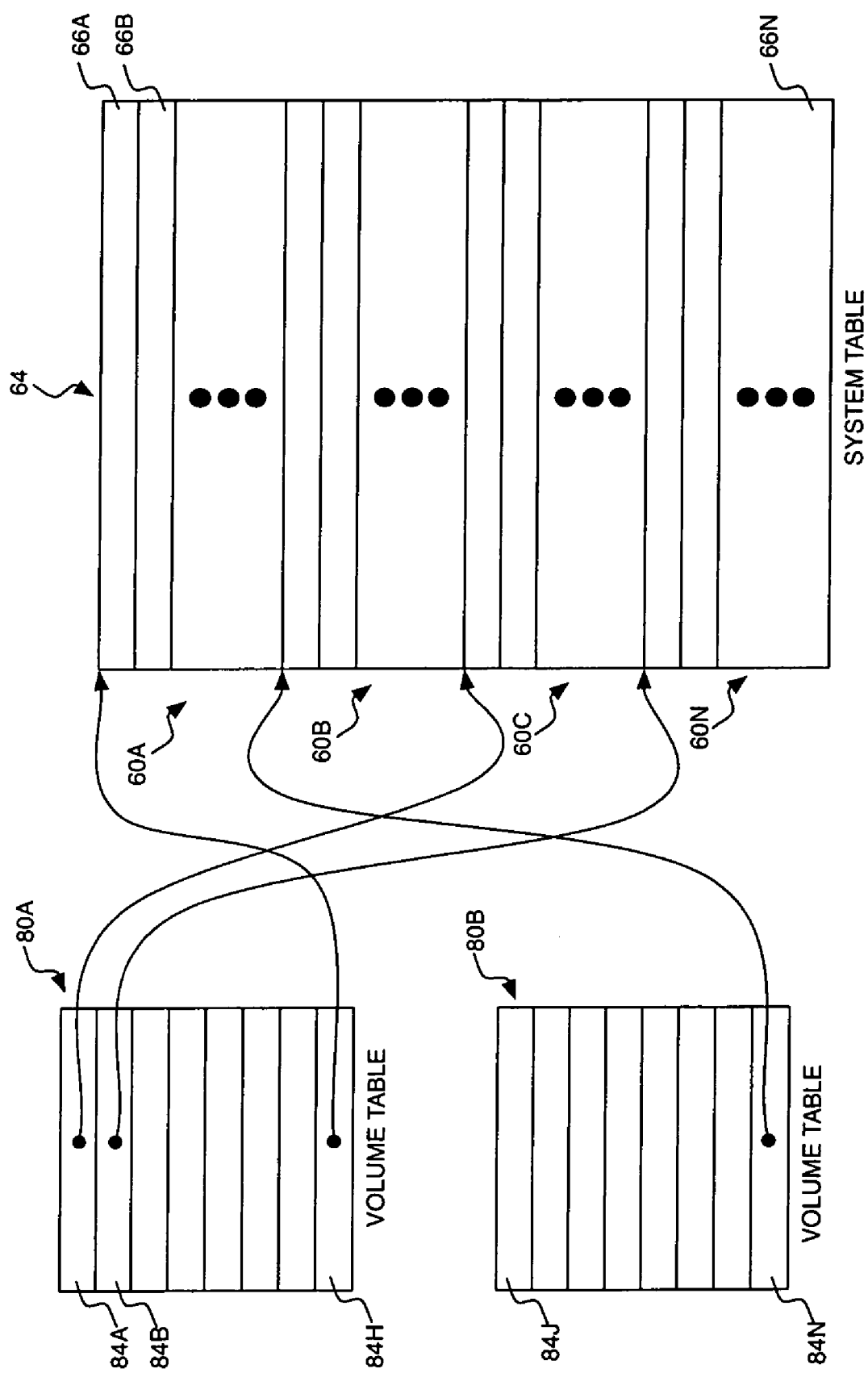

Referring now to FIG. 6, additional details regarding the system table and a volume table data structure provided by and utilized in the embodiments of the invention will be described. As shown in FIG. 6, a volume table 80A-80B is utilized for each logical storage volume defined in the computer 2. The volume tables 80A-80B include entries 84A-84H and 84J-84N, respectively, for each territory in a logical volume. For instance, the entry 84A corresponds to the first territory in the volume corresponding to the volume table 80A. Other entries in the volume table correspond to other portions of the logical volume.

Each entry in a volume table 80A-80B can be utilized to store a pointer to a territory in the system table 64. The pointer is created when physical space for the logical territory in the volume is allocated. For instance, a first write request may be received that is directed to the territory referenced by the entry 84H of the volume table 80A. In response to the request, physical space is allocated by creating a pointer in the entry 84H to the next available territory, the territory 60A, in the system table 64. If a second write request is received directed to the territory referenced by the entry 84N in the volume table 80B, space is allocated by creating a pointer in the entry 84N to the next available territory 60B. A third write operation directed to a portion of the volume corresponding to the entry 84A will cause a pointer to be created to the territory 60C. Similarly, a fourth write operation that is directed to a portion of the volume corresponding to the entry 84B will cause a pointer to be created to the territory 60N referenced by the system table 64. In this manner, physical space is allocated for logical territories within volumes on an as needed basis.

It should be appreciated that, according to embodiments of the invention, the territories within a volume may be alternately allocated from storage devices connected to different hosts. For instance, storage for the even numbered territories within a volume may be allocated from physical devices connected to a first node, while storage for the odd numbered territories within the volume may be allocated from physical devices connected to a second node. Allocating storage for territories in this manner can improve read/write performance.

When read operations are received, it is necessary to utilize both the volume table for the corresponding logical volume and the system table to perform the read operation. In particular, the appropriate volume table is examined to determine the location within the system table that refers to the territory where the requested data is stored. From the system table, the start of the physical location containing the requested territory can be determined. The offset within the particular territory can then be utilized to locate the actual data. Additional details regarding this process are described below with reference to FIG. 9.

It should be appreciated that new entries may be added to each of the volume tables, thereby allowing the logical volumes to grow to any size within the available physical capacity. Moreover, it should be appreciated that because the size of logical volumes is only limited by the available physical storage space, it is unnecessary to define the size of the logical volumes in advance. Alternatively, the logical volumes may be defined as any size, even sizes larger than the available physical capacity. This is possible because physical space is allocated only as needed.

Because provisioning physical space in the manner described herein does not actually provide more physical space than actually available to the computer 2, additional physical capacity must be added when write requests can no longer be allocated an available territory. To prevent loss of availability when this occurs, warnings must be provided to a system administrator in advance that space is being depleted. Accordingly, a monitoring function is provided for determining when the total amount of physical space that may be allocated to volumes is below a predefined threshold. Additionally, a monitoring function may also be provided for determining when the amount of space available for allocation to snapshot provisions falls below a predefined threshold. When either of these situations occurs, a warning may be generated and transmitted to a system administrator so that additional physical capacity may be added. Additional details regarding this process are provided below with respect to FIG. 9.

It should also be appreciated that when snapshots are active in the computer 2 and a write request is received directed to a provision that was allocated in the manner above and written to during previous snapshot lifetime, a new provision must be allocated for the snapshot. To accomplish this, a new provision is allocated in the portion of the system table 64 allocated for snapshots and a link is created between the entry in the system table 64 for the new provision and the entry in the system table 64 for the provision during the previous snapshot lifetime. Additional details regarding this process are provided below with respect to FIG. 8.

Figure 7:
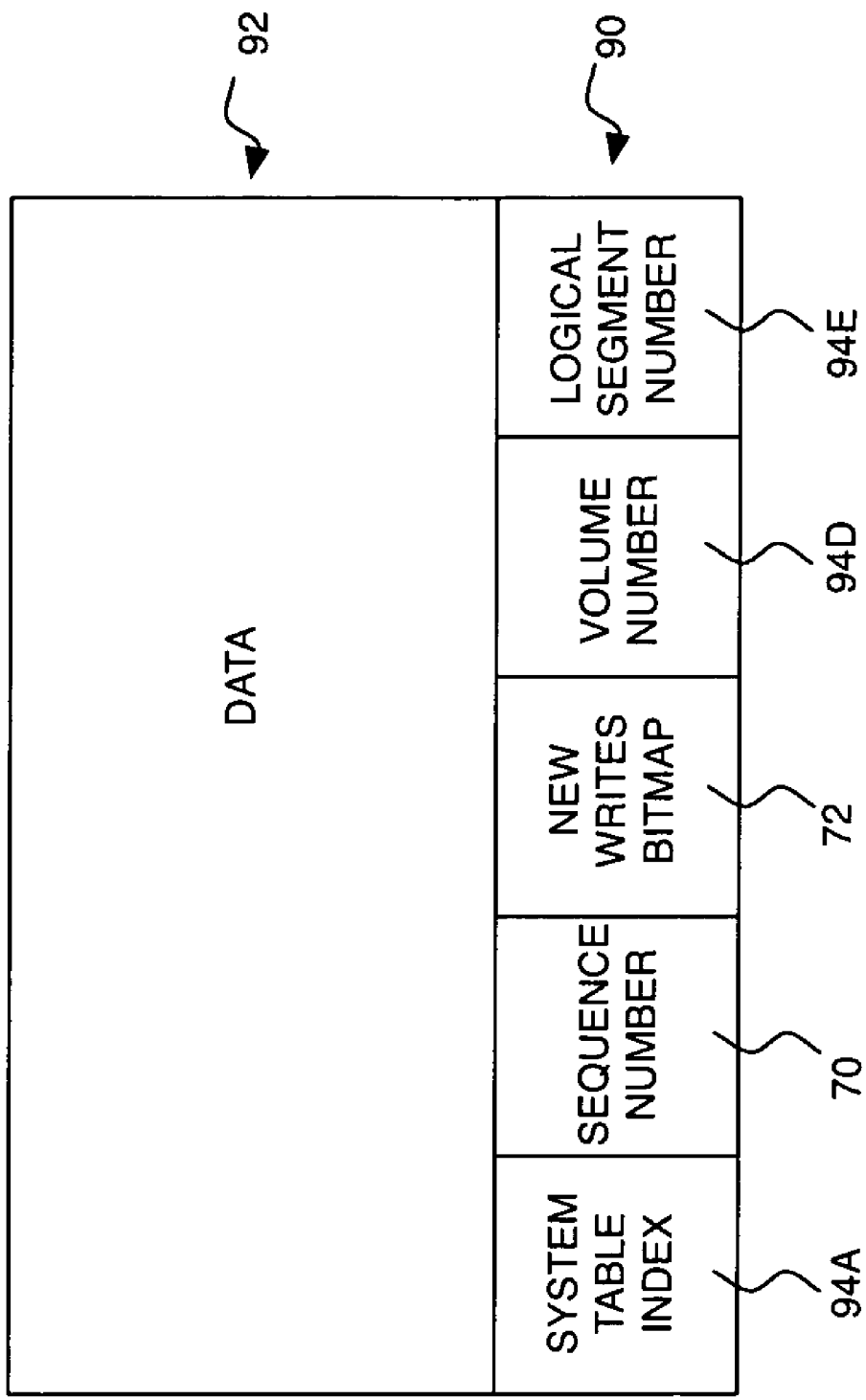

Turning now to FIG. 7, details regarding a provision table data structure provided by and utilized in the various embodiments of the invention will be described. Because the system table 64 and the volume tables 80 are typically stored in the RAM 18 of the computer 2, the data stored therein is susceptible to loss if power is to fail to the computer 2. While it is possible to write the data described above to disk each time a change is made, the large number of writes required to store all of the data would impose a significant performance penalty. The solution provided by the embodiments of the invention to this problem is to compress the data for each write into a single metadata structure that is maintained consistently on disk, and from which the volume tables and the system table can be reconstructed in the event of a power failure. This data structure is referred to herein as a provision table.

FIG. 7 illustrates a provision table 90 that is provided by the embodiments of the invention. A provision table 90 is associated with each provision and is stored interleaved with the data 92 of the provision. The provision table 90 is written whenever the system table 64 is changed. Because the system table 90 is changed each time a new writes bitmap field 72 changes, a provision table 90 is ultimately written each time the new writes bitmap field 72 for the provision is modified.

The provision table 90 includes a system table index field 94A that identifies the entry in the system table 64 that the provision table 90 corresponds to. The provision table 90 also includes a sequence number field 70 that identifies the sequence number of the snapshot. The provision table 70 also includes the new writes bitmap 72 for the provision, described above. A volume number field 94D and a logical segment number field 94E are also provided within the provision table 90 to identify the volume and segment that the provision belongs to, respectively. The contents of each of the provision tables 90 can be utilized to recreate the system table 64 and the volume tables 80. It should be appreciated that the metadata associated with the storage system may be preserved on disk in ways other than the methods described above, such as logging metadata changes to a log partition. The following paragraphs apply equally to these other ways of preserving metadata also.

Turning now to FIG. 8, additional details will be provided regarding the allocation of new provisions for snapshots and the data structure utilized to organize the provisions for each snapshot lifetime. In particular, FIG. 8 illustrates a territory diagram 100 that comprises an array of linked lists. Each node 102A-102G in the territory diagram corresponds to an entry in the system table 64. The practice of allocating a fresh provision for each sequence number yields the territory diagram 100 shown in FIG. 8.

As mentioned above, each node 102 in the linked list includes a first data field for storing the provision number that identifies the snapshot lifetime that the provision was allocated in, a second data field for storing the bitmap that identifies the chunks of the provision that were written to in the snapshot lifetime identified by the provision number, and a third data field that includes a pointer to the next node in the linked list. For instance, the node 102A includes a pointer to the node 102B. As will be described in greater detail below, a read operation is performed by iterating through the linked list to locate the provision having the latest sequence number and also having valid data for the requested chunk. Additionally, as will be described herein, typically complex operations such as deleting a snapshot and rolling a snapshot back onto a volume can be performed by simply modifying the contents of the linked list. Additional details regarding these processes are provided below.

Figure 9:
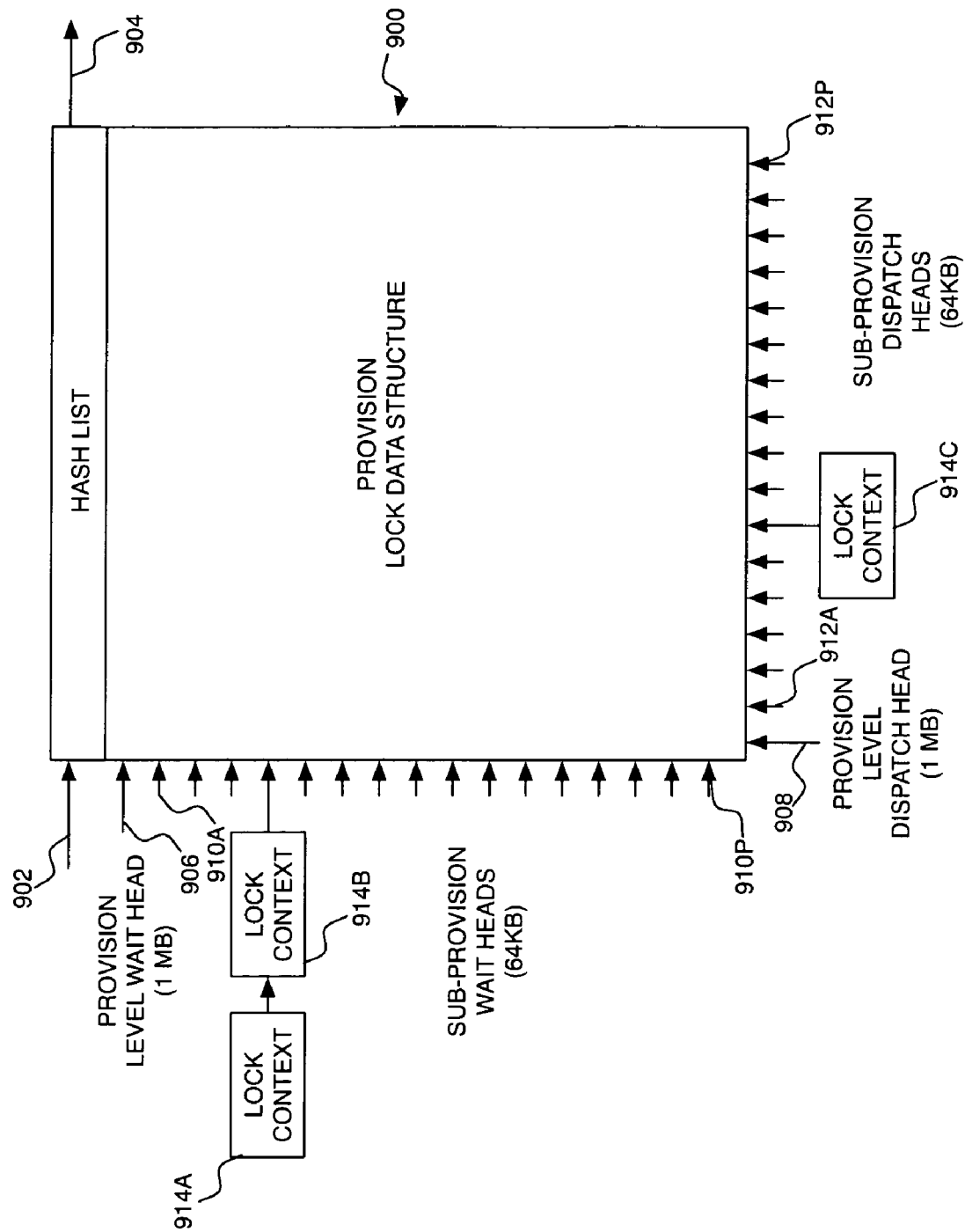
FIG. 9 is a data structure diagram illustrating aspects of a lock data structure provided according to the various embodiments of the invention.

Referring now to FIG. 9, additional details regarding a lock data structure 900 utilized by the locking module 44D will be described. As discussed briefly above, the locking module 44D provides functionality for synchronizing I/O operations. In order to synchronize I/O operations to prevent data corruption, the locking module 44D implements a locking architecture in which there are two kinds of locks. The first kind of lock is referred to herein as a reader lock. A reader lock is acquired whenever data is being read or written based on information that is present in a volatile memory structure, but the I/O operation does not change the metadata. All read operations and non-read-modify-write write operations acquire this kind of lock. The second kind of lock is referred to herein as a writer lock. A writer lock is acquired whenever an I/O cycle causes metadata to change. This type of lock is acquired during first new writes, defragmentation and other operations that modify metadata. While multiple reader locks may be acquired, it is not possible to acquire either a reader lock or a writer lock when a writer lock has been granted.

Some types of operations, such as compaction, operate on an entire provision at a time, changing the metadata across chunks. Such operations can acquire a reader or writer lock at the granularity of the unit of storage allocation, the provision. Other operations, such as normal read and write operations, require, and acquire, smaller locks, of chunk granularity (the unit of snapshot read-modify-write). Accordingly, it should be appreciated that reader and writer locks may be acquired at either the granularity of a unit of storage allocation or the granularity of a snapshot read-modify-write. Details of how this is accomplished using the lock data structure 900 are provided below.

As described briefly above, locking is accomplished utilizing the lock data structure 900. According to embodiments of the invention, locks are awarded on the basis of virtual provision numbers. In one embodiment, a lock structure 900 may be maintained in core memory for each virtual provision number that can be locked. In another embodiment, a pool of lock data structures 900 is maintained along with a set of hash heads. For instance, 4096 lock structures may be maintained in core memory along with 4096 hash heads. The hash heads are associated with virtual provision numbers by dividing the set of all provision numbers into 4096 hash buckets. The hash function may be a simple modulo function (i.e. the lock structure is given by the virtual provision number modulo 4096) or other type of hash function known to those skilled in the art. In this manner, the number of lock data structures 900 maintained in core memory can be significantly less than the total number of virtual provision numbers. As will be described in greater detail below, lock data structures may be returned to the pool when no longer needed for a particular virtual provision number.

The illustrative lock data structure 900 shown in FIG. 9 uses the representative values of 1MB for provision size and 64 kB for chunk size. Other values for the provision and chunk size may also be utilized. The lock data structure 900 includes the hash pointers 902 and 904 for adding the data structure 900 to a hash list. The lock data structure 900 also includes 17 wait heads 906 and 910A-910P, and 17 dispatch heads 908 and 912A-912P. The wait heads are list heads that are utilized to create a wait queue for each provision and for each unique sub-provision portion (chunk). For instance, the wait head 906 is for creating a wait queue for a reader or writer lock for the entire provision. The wait heads 910A-910P are for creating wait queues for each unique sub-provision portion of the provision. If a lock acquire request cannot be satisfied immediately, it is added to the appropriate wait queue. Lock requests come in the form of a lock context data structure which is added to the appropriate wait queue. For instance, as shown in FIG. 9, two requests identified by the lock context data structures 914A and 914B have been added to a sub-provision wait head, thereby forming a queue. Additional details regarding the lock context data structure will be provided below with respect to FIG. 10.

When a lock is available for granting to a particular request, the lock context for the request is moved from the wait queue to the appropriate dispatch queue. The dispatch heads point to all of the requests that have acquired, but not yet released the lock. For instance, the provision level dispatch head 908 points to any requests that have acquired but not yet released the provision level lock. Each of the dispatch heads 912A-912P point to any requests that have acquired but not yet released the lock for the corresponding sub-portion of the provision. For instance, the lock context 914C has acquired a lock for a sub-portion of the provision, but has not yet released the lock. Hence, the wait heads point to all the waiting requests for a lock, while the dispatch heads point to all the requests that have acquired, but not yet released the lock. Any dispatch queue may contain any number of reader requests, but if a writer request has been dispatched, no other request may be in the dispatch queue.

Figure 10:
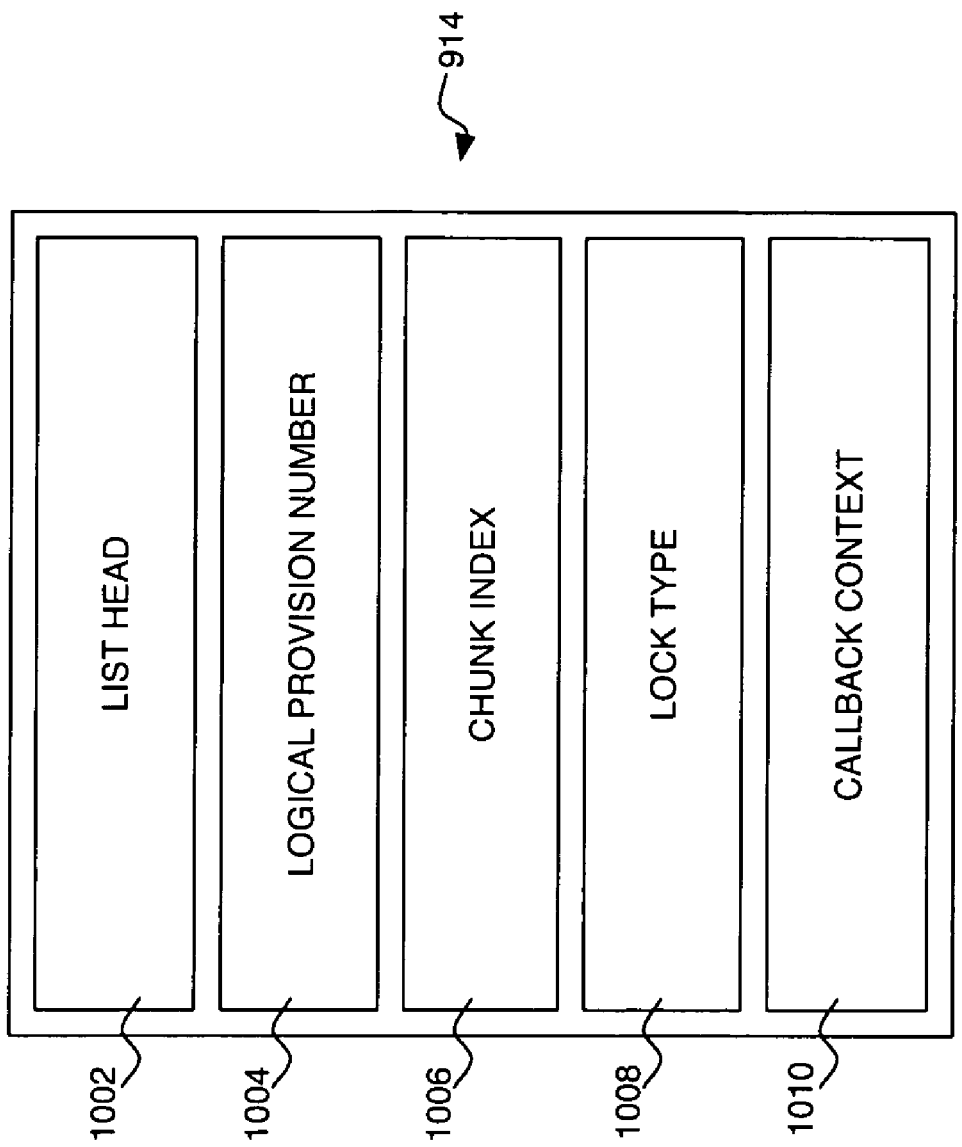
FIG. 10 is a data structure diagram illustrating aspects of a lock context data structure provided according to one embodiment of the invention.

Referring now to FIG. 10, additional details regarding a lock context data structure 914 provided in an embodiment of the invention will be described. As discussed briefly above, the lock context data structure 914 is utilized to request a lock. If the lock cannot be granted immediately, the lock context data structure 914 for the request is added to the appropriate wait queue. When the request can be granted, the lock context data structure 914 for the request is moved to the appropriate dispatch queue.

The lock context data structure 914 includes a list head 1002 so that it can be added to the appropriate queue. The lock context data structure also includes the logical provision number 1004 of the requested provision, the chunk index 1006 of the I/O operation, and an indication 1008 of the requested lock type (i.e. a reader or writer lock). The lock context data structure 914 further includes a callback context 1010 with a context to call when the lock is acquired successfully. The process requesting the I/O operation encapsulates the required information within the lock context data structure 914 and passes the structure with the request to perform an I/O operation.

Figure 11:
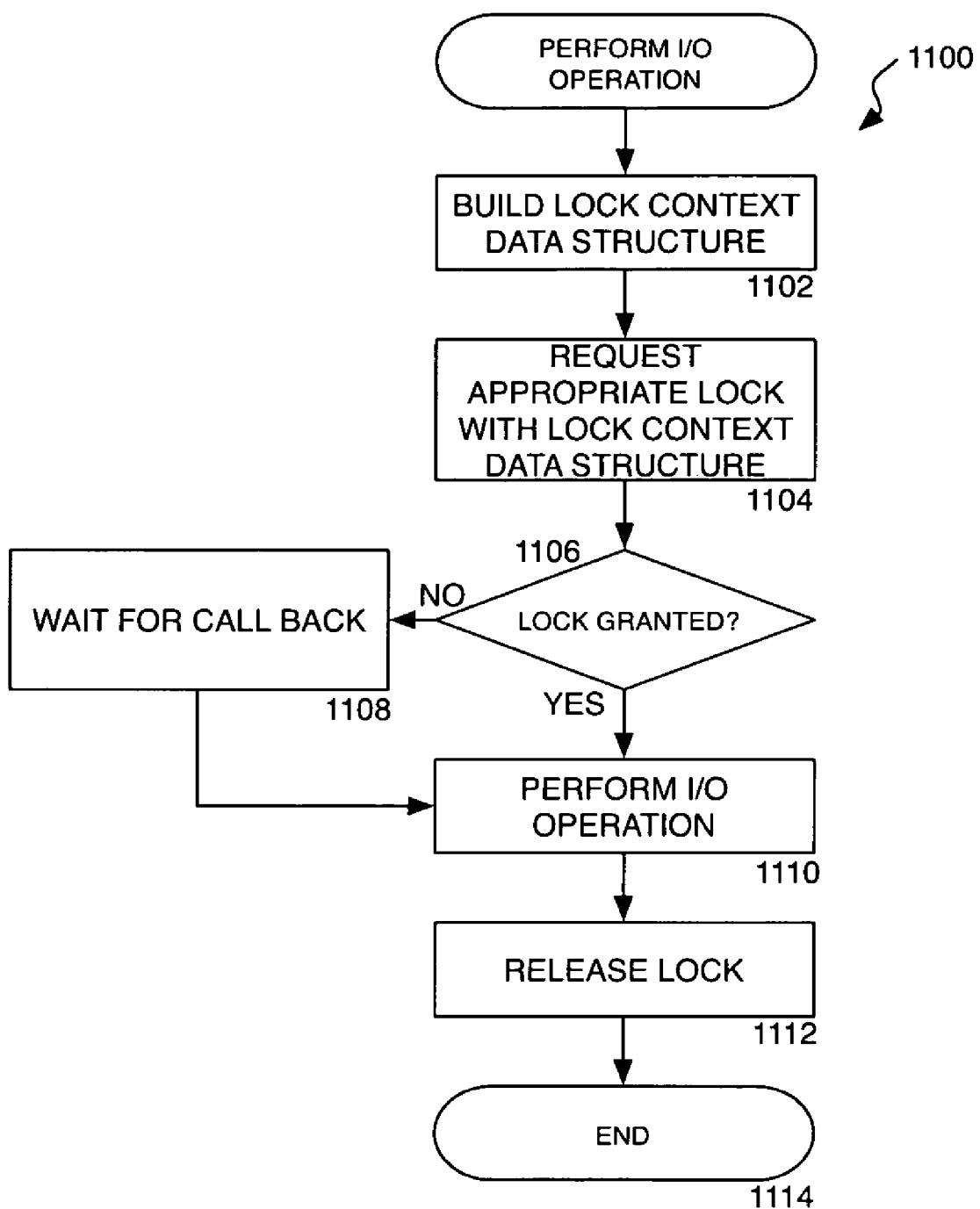
FIGS. 11, 12A-12B, and 13 are flow diagrams illustrating aspects of several routines for synchronizing I/O operations provided by the embodiments of the invention.

Referring now to FIG. 11, additional details regarding the operation of the computer 2 for synchronizing I/O operations will be provided. In particular, a routine 1100 will be described illustrating operations performed by the computer 2 for performing a synchronized I/O operation. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 11-13, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 1100 begins at operation 1102, where a process desiring to perform an I/O operation builds the lock context data structure and populates the structure with the necessary information described above. The routine 1100 then continues to operation 1104, where the process makes a request for the appropriate lock utilizing the populated lock context data structure. At decision operation 1106, a determination is made as to whether the requested lock was granted. If the request was not immediately granted, the routine 1100 branches to operation 1108 where the process waits for a callback indicating that the request was granted. As discussed above with respect to FIG. 10, the lock context data structure 914 includes a callback context 1010 for this purpose.

If, at operation 1106, it is determined that the lock was granted, the routine 1100 continues to operation 1110 where the requested I/O operation is performed. Once the process has completed the operation, the routine 1100 continues to operation 1112, where the assigned lock is released. From operation 1112, the routine 1100 continues to operation 1114, where it ends.

Figure 12A:
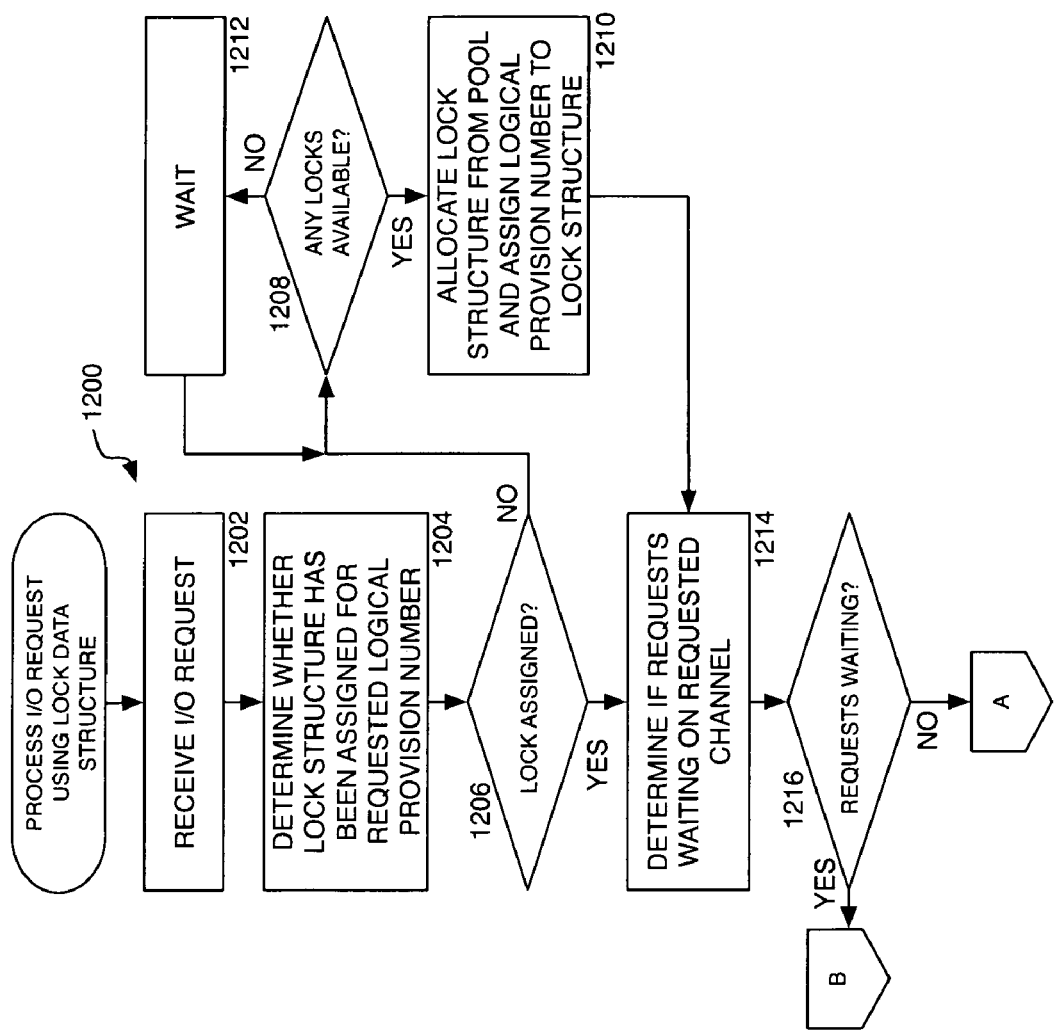
Figure 12B:
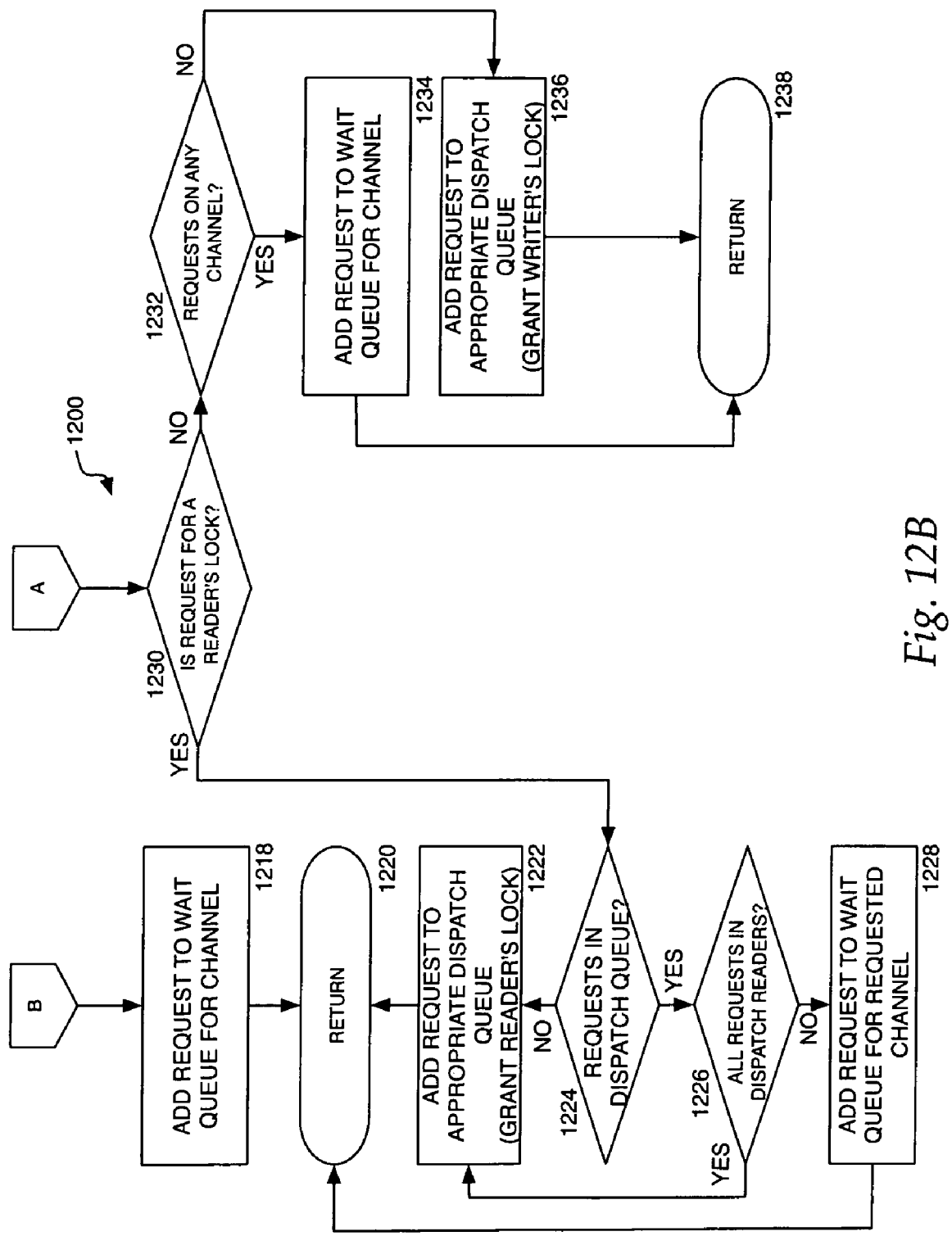

Referring now to FIGS. 12A-12B, an illustrative routine 1200 will be described illustrating aspects of a process for allocating a lock data structure, if necessary, and responding to requests for locks. The routine 1200 begins at operation 1202, where a request to perform an I/O operation is received that includes a lock context data structure 914. In response to receiving such a request, the routine 1200 continues to operation 1204, where a determination is made as to whether a lock data structure 900 has been allocated from the pool for the virtual provision number identified in the request. If a lock data structure has previously been assigned to the logical provision number identified in the request, the routine 1200 continues from operation 1206 to operation 1214. If a lock data structure has not been assigned to the requested logical provision number, the routine 1200 branches from operation 1206 to operation 1208.

At operation 1208, a determination is made as to whether there are any available lock data structures in the pool. If no lock data structures are available, the routine 1200 branches from operation 1208 to operation 1212. At operation 1212, a short delay is incurred and the routine 1200 then continues back to operation 1208 to again determine if any lock data structures are available in the pool. If, at operation 1208, it is determined that a lock data structure is available in the pool, the routine 1200 continues from operation 1208 to operation 1210. At operation 1208, a fresh lock data structure is taken from the pool and assigned to the requested virtual provision number. The routine 1200 then continues from operation 1210 to operation 1214.

At operation 1214, a determination is made as to whether there are any requests waiting on the requested lock. For instance, this may be accomplished by determining whether any other requests are currently on the wait queue for the requested lock (i.e. the wait head for the requested queue is pointing to any requests). If requests are waiting, the routine 1200 branches to operation 1218, where the request is added to the wait queue for the requested lock. The routine then continues to operation 1220, where it returns. If no requests are waiting, the routine 1200 continues from operation 1216 to operation 1230.

At operation 1230, a determination is made as to whether the request is for a reader lock or a writer lock based on the contents of the lock type 1008 of the lock context data structure 914 of the request. If the request is for a reader lock, the routine branches to operation 1224 where a determination is made as to whether any requests are in the dispatch queue for the requested lock. If no requests are in the dispatch queue for the requested lock, the routine 1200 branches from operation 1224 to operation 1222 where the request is added to the dispatch queue for the requested lock, thereby granting the requested reader lock. If requests are in the dispatch queue for the requested lock, the routine 1200 branches to operation 1226 where a determination is made as to whether all of the requests in the dispatch queue for the requested lock are readers. If all of the requests in the dispatch queue for the requested lock are readers, the routine 1200 branches from operation 1226 to operation 1222 where the request is added to the dispatch queue for the requested lock, thereby granting the requested reader lock. If all of the requests in the dispatch queue are not readers, the routine 1200 branches from operation 1226 to operation 1228 where the request is added to the wait queue for the requested lock. From operations 1228 and 1222, the routine 1200 continues to operation 1220, where it returns.

If, at decision operation 1230, it is determined that the requested lock is a writer lock, the routine 1200 branches from operation 1230 to operation 1232. At operation 1232, a determination is made as to whether there are any requests on any channel. If there are no requests on any channel, the routine 1200 branches from operation 1232 to operation 1236, where the request is added to the dispatch queue for the requested lock. This is for both chunk as well as provision locks and is to prevent two chunk writer locks from being granted at the same time. If there are requests waiting on any channel, the routine 1200 continues to operation 1234, where the request is added to the wait queue for the requested lock. From operations 1234 and 1236, the routine 1200 continues to operation 1238, where it returns.

Figure 13:
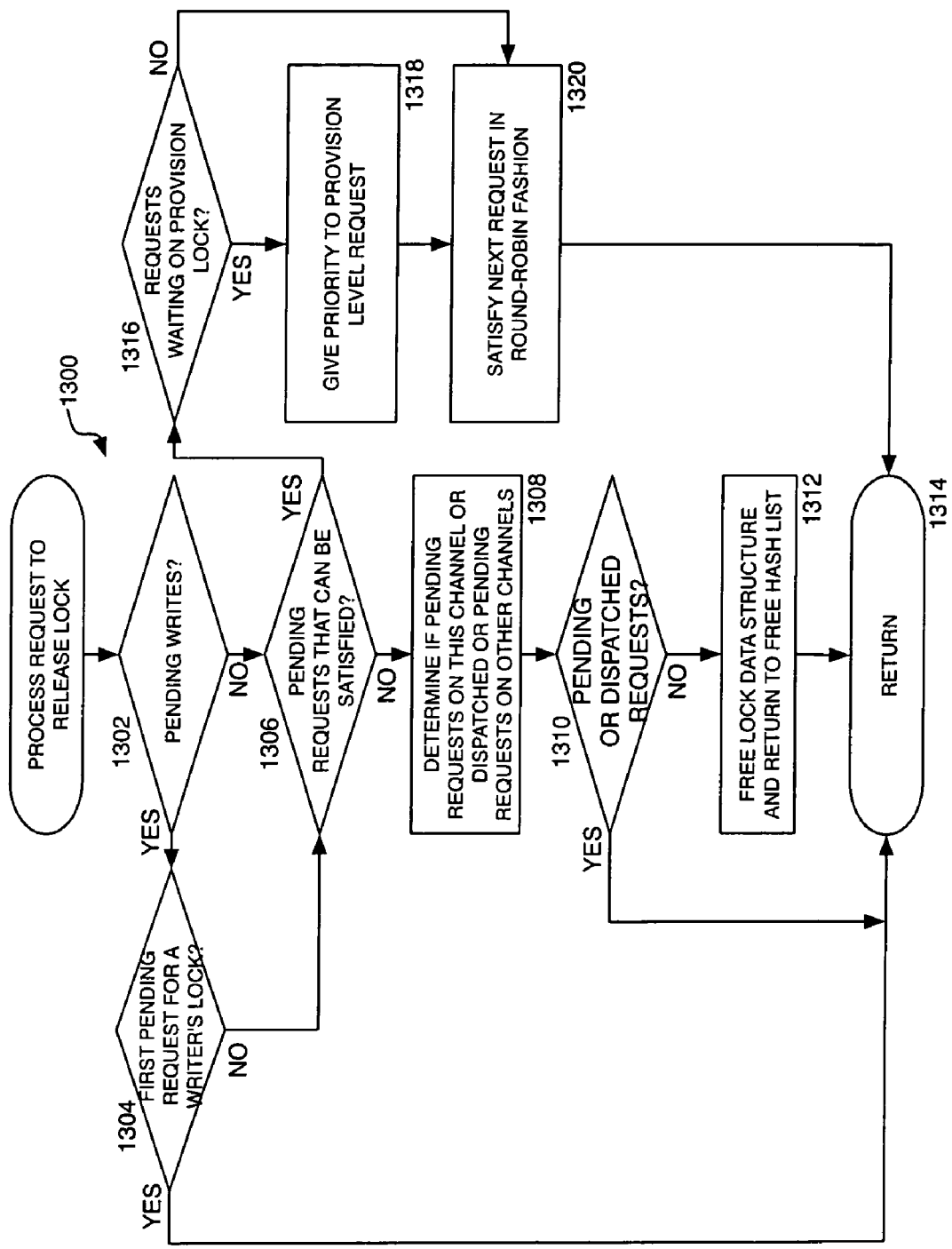

Turning now to FIG. 13, an illustrative routine 1300 will be described for processing the release of a lock by a dispatched I/O operation. In particular, the routine 1300 begins at operation 1302, where a determination is made based on the lock data structure as to whether there are any pending write operations. If so, the routine 1300 branches from operation 1302 to operation 1304, where a determination is made as to whether the first pending request is for a writer lock. If so, the routine branches to operation 1314, where control returns. If not, the routine 1300 continues to operation 1306. At operation 1306, a determination is made as to whether there are any pending requests that can be satisfied. If so, the routine 1300 branches to operation 1316, where a determination is made as to whether any requests are waiting on the provision level lock. If so, the routine 1300 continues to operation 1318 where the provision level lock request is given priority over other requests. The routine 1300 then continues to operation 1320, where the next request is satisfied in round-robin fashion so as to prevent the repeated granting of a single lock from starving the others. From operation 1320, the routine 1300 continues to operation 1314, where control returns.

If, at operation 1306, it is determined that there are no pending requests that can be satisfied, the routine 1300 continues from operation 1306 to operation 1308. At operation 1308, a determination is made as to whether there are requests pending for the requested lock or dispatched or pending requests for other locks. If so, the routine branches from operation 1310 to operation 1314, where it ends. If not, the routine 1300 continues from operation 1310 to operation 1312. At operation 1312, the lock data structure is freed and returned to the free hash list. In this manner, the lock data structure is returned to the pool when all locks have been released. From operation 1312, the routine 1300 continues to operation 1314, where it returns.

It will be appreciated that embodiments of the present invention provide a method, apparatus, system, and computer-readable medium for synchronizing I/O operations. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for synchronizing input/output operations in a data storage computer system, the method comprising:
maintaining a lock data structure corresponding to a provision of the data storage capacity of the computer system, the lock data structure comprising a provision level wait head that points to any requests waiting for a provision level lock, one or more sub-provision level wait heads that point to any requests waiting for a sub-provision level lock, a provision level dispatch head that points to any requests that have acquired but not yet released a provision level lock, and one or more sub-provision level dispatch heads that point to any requests that have acquired but not yet released a corresponding sub-provision level lock.

2. The method of claim 1, wherein the provision level lock corresponds to a unit of storage space allocation, and wherein the sub-provision level locks correspond to a unit of snapshot read-modify-write.

3. The method of claim 2, further comprising:
receiving a request to obtain a provision level lock;
in response to the request, determining whether the provision level wait head is pointing to any waiting requests; and
in response to determining that the provision level wait head is pointing to one or more waiting requests, adding the request to obtain the provision level lock to the provision level wait head.

4. The method of claim 3, further comprising:
receiving a request to obtain a sub-provision level lock;
in response to the request, determining whether the sub-provision level wait head corresponding to the requested lock is pointing to any waiting requests; and
in response to determining that the provision level wait head is pointing to one or more waiting requests, adding the request to obtain the provision level lock to the corresponding provision level wait head.

5. The method of claim 4, further comprising in response to determining that the provision level wait head is not pointing to any waiting requests, or that the sub-provision level wait head corresponding to the requested lock is not pointing to any waiting requests:
determining whether the requested lock is a reader lock or a writer lock;
in response to determining that the requested lock is a reader lock, determining whether any requests are pointed to by the corresponding dispatch head;
in response to determining that no requests are pointed to by the corresponding dispatch head, adding the request to the corresponding dispatch head.

6. The method of claim 5, further comprising:
in response to determining that requests are pointed to by the corresponding dispatch head, determining whether all of the requests pointed to by the corresponding dispatch head are reader locks;
in response to determining that all of the requests pointed to by the corresponding dispatch head are reader locks, adding the request to the corresponding dispatch head; and
in response to determining that all of the requests pointed to by the corresponding dispatch head are not reader locks, adding the request to the wait head for the request.

7. The method of claim 6, further comprising in response to determining that the requested lock is a writer lock:
determining whether any requests are pointed to by any wait head;

in response to determining that at least one request is pointed to by a wait head, adding the request for a writer lock to the wait head for the request; and in response to determining that no requests are pointed to by any wait head, granting the writer lock by adding the request to the dispatch head for the requested lock.

8. The method of claim 7, wherein the request comprises a lock context data structure, the lock context data structure comprising an identification of the provision and sub-provision, an indication as to whether the request is for a reader lock or a writer lock, and a callback context for notifying a requesting process that a lock has been granted.

9. The method of claim 8, further comprising:
maintaining a plurality of lock data structures in a pool;
in response to receiving a request to obtain a lock for a provision or sub-provision, allocating a lock data structure from the pool and associating the allocated structure with the requested provision using a hash function; and
returning the allocated lock data structure to the pool when all provision level or sub-provision level locks in the allocated data structure have been released.

10. The method of claim 9, further comprising in response to the release of a lock:
determining whether there are any pending read or write requests that can be satisfied;
in response to determining that there are pending read or write requests that can be satisfied, satisfying the next read or write request using a round-robin procedure.

11. The method of claim 10, further comprising in response to determining that there are pending read or write requests that can be satisfied:
determining whether any requests are waiting on the provision level lock; and
in response to determining that requests are waiting on the provision level lock, prioritizing the request for the provision level lock.

12. A computer storage medium having computer-executable instructions stored thereon which, when executed by a computer system, cause the computer system to:
maintain a lock data structure corresponding to a provision of the data storage capacity of the computer system, the lock data structure comprising a provision level wait head that points to any requests waiting for a provision level lock, one or more sub-provision level wait heads that point to any requests waiting for a sub-provision level lock, a provision level dispatch head that points to any requests that have acquired but not yet released a provision level lock, and one or more sub-provision level dispatch heads that point to any requests that have acquired but not yet released a corresponding sub-provision level lock.

13. The computer storage medium of claim 12, wherein the provision level lock corresponds to a unit of storage space allocation, and wherein the sub-provision level locks correspond to a unit of snapshot read-modify-write.

14. The computer storage medium of claim 13, having further computer-executable instructions stored thereon which, when executed by the computer system, cause the computer system to:
receive a request to obtain a provision level lock;
in response to the request, to determine whether the provision level wait head is pointing to any waiting requests; and
in response to determining that the provision level wait head is pointing to one or more waiting requests, to add the request to obtain the provision level lock to the provision level wait head.

15. The computer storage medium of claim 14, having further computer-executable instructions stored thereon which, when executed by the computer system, cause the computer system to:
receive a request to obtain a sub-provision level lock;
in response to the request, to determine whether the sub-provision level wait head corresponding to the requested lock is pointing to any waiting requests; and
in response to determining that the provision level wait head is pointing to one or more waiting requests, to add the request to obtain the provision level lock to the corresponding provision level wait head.

16. The computer storage medium of claim 15, having further computer-executable instructions stored thereon which, when executed by the computer system, cause the computer system in response to determining that the provision level wait head is not pointing to any waiting requests, or that the sub-provision level wait head corresponding to the requested lock is not pointing to any waiting requests to:
determine whether the requested lock is a reader lock or a writer lock;
in response to determining that the requested lock is a reader lock, to determine whether any requests are pointed to by the corresponding dispatch head; and
in response to determining that no requests are pointed to by the corresponding dispatch head, to add the request to the corresponding dispatch head.

17. The computer storage medium of claim 16, having further computer-executable instructions stored thereon which, when executed by the computer system, cause the computer system to:
in response to determining that requests are pointed to by the corresponding dispatch head, to determine whether all of the requests pointed to by the corresponding dispatch head are reader locks;
in response to determining that all of the requests pointed to by the corresponding dispatch head are reader locks, to add the request to the corresponding dispatch head; and
in response to determining that all of the requests pointed to by the corresponding dispatch head are not reader locks, to add the request to the wait head for the request.

18. The computer storage medium of claim 17, having further computer-executable instructions stored thereon which, when executed by the computer system, cause the computer system in response to determining that the requested lock is a writer lock to:
determine whether any requests are pointed to by any wait head;
in response to determining that at least one request is pointed to by a wait head, to add the request for a writer lock to the wait head for the request; and
in response to determining that no requests are pointed to by any wait head, to grant the writer lock by adding the request to the dispatch head for the requested lock.

19. The computer storage medium of claim 18, wherein the request comprises a lock context data structure, the lock context data structure comprising an identification of the provision and sub-provision, an indication as to whether the request is for a reader lock or a writer lock, and a callback context for notifying a requesting process that a lock has been granted.

20. The computer storage medium of claim 19, having further computer-executable instructions stored thereon which, when executed by the computer system, cause the computer system to:
maintain a plurality of lock data structures in a pool;
in response to receiving a request to obtain a lock for a provision or sub-provision, to allocate a lock data structure from the pool and associating the allocated structure with the requested provision using a hash function; and to return the allocated lock data structure to the pool when all provision level or sub-provision level locks in the allocated data structure have been released.

21. The computer storage medium of claim 20, having further computer-executable instructions stored thereon which, when executed by the computer system, cause the computer system in response to the release of a lock to:
   determine whether there are any pending read or write requests that can be satisfied; and
   in response to determining that there are pending read or write requests that can be satisfied, to satisfy the next read or write request using a round-robin procedure.

22. The computer storage medium of claim 21, having further computer-executable instructions stored thereon which, when executed by the computer system, cause the computer system in response to determining that there are pending read or write requests that can be satisfied to:
   determine whether any requests are waiting on the provision level lock; and
   in response to determining that requests are waiting on the provision level lock, to prioritize the request for the provision level lock.

23. A computer-controlled apparatus comprising:
   a central processing unit; and
   a computer storage medium comprising computer-executable instructions for execution by the central processing unit which, when executed by the central processing unit, will cause the computer-controlled apparatus to maintain a lock data structure corresponding to a provision of the data storage capacity of a computer system, the lock data structure comprising a provision level wait head that points to any requests waiting for a provision level lock, one or more sub-provision level wait heads that point to any requests waiting for a sub-provision level lock, a provision level dispatch head that points to any requests that have acquired but not yet released a provision level lock, and one or more sub-provision level dispatch heads that point to any requests that have acquired but not yet released a corresponding sub-provision level lock.

24. The computer-controlled apparatus of claim 23, wherein the provision level lock corresponds to a unit of storage space allocation, and wherein the sub-provision level locks correspond to a unit of snapshot read-modify-write.

25. The computer-controlled apparatus of claim 24, wherein the computer storage medium has further computer-executable instructions stored thereon which, when executed by the central processing unit, will cause the apparatus to:
   receive a request to obtain a provision level lock;
   in response to the request, to determine whether the provision level wait head is pointing to any waiting requests; and
   in response to determining that the provision level wait head is pointing to one or more waiting requests, to add the request to obtain the provision level lock to the provision level wait head.

26. The computer-controlled apparatus of claim 25, wherein the computer storage medium has further computer-executable instructions stored thereon which, when executed by the central processing unit, will cause the apparatus to:
   receive a request to obtain a sub-provision level lock;
   in response to the request, to determine whether the sub-provision level wait head corresponding to the requested lock is pointing to any waiting requests; and
   in response to determining that the provision level wait head is pointing to one or more waiting requests, to add the request to obtain the provision level lock to the corresponding provision level wait head.

27. The computer-controlled apparatus of claim 26, wherein the computer storage medium has further computer-executable instructions stored thereon which, when executed by the central processing unit, will cause the apparatus in response to determining that the provision level wait head is not pointing to any waiting requests, or that the sub-provision level wait head corresponding to the requested lock is not pointing to any waiting requests to:
   determine whether the requested lock is a reader lock or a writer lock;
   in response to determining that the requested lock is a reader lock, to determine whether any requests are pointed to by the corresponding dispatch head; and
   in response to determining that no requests are pointed to by the corresponding dispatch head, to add the request to the corresponding dispatch head.

28. The computer-controlled apparatus of claim 27, wherein the computer storage medium has further computer-executable instructions stored thereon which, when executed by the central processing unit, will cause the apparatus to:
   in response to determining that requests are pointed to by the corresponding dispatch head, to determine whether all of the requests pointed to by the corresponding dispatch head are reader locks;
   in response to determining that all of the requests pointed to by the corresponding dispatch head are reader locks, to add the request to the corresponding dispatch head; and
   in response to determining that all of the requests pointed to by the corresponding dispatch head are not reader locks, to add the request to the wait head for the request.

29. The computer-controlled apparatus of claim 28, wherein the computer storage medium has further computer-executable instructions stored thereon which, when executed by the central processing unit, will cause the apparatus in response to determining that the requested lock is a writer lock to:
   determine whether any requests are pointed to by any wait head;
   in response to determining that at least one request is pointed to by a wait head, to add the request for a writer lock to the wait head for the request; and
   in response to determining that no requests are pointed to by any wait head, to grant the writer lock by adding the request to the dispatch head for the requested lock.

30. The computer-controlled apparatus of claim 29, wherein the request comprises a lock context data structure, the lock context data structure comprising an identification of the provision and sub-provision, an indication as to whether the request is for a reader lock or a writer lock, and a callback context for notifying a requesting process that a lock has been granted.

31. The computer-controlled apparatus of claim 30, wherein the computer storage medium has further computer-executable instructions stored thereon which, when executed by the central processing unit, will cause the apparatus to:
   maintain a plurality of lock data structures in a pool;
   in response to receiving a request to obtain a lock for a provision or sub-provision, to allocate a lock data structure from the pool and associating the allocated structure with the requested provision using a hash function; and to return the allocated lock data structure to the pool when all provision level or sub-provision level locks in the allocated data structure have been released.

32. The computer-controlled apparatus of claim 31, wherein the computer storage medium has further computer-executable instructions stored thereon which, when executed by the central processing unit, will cause the apparatus in response to the release of a lock to:

determine whether there are any pending read or write requests that can be satisfied; and in response to determining that there are pending read or write requests that can be satisfied, to satisfy the next read or write request using a round-robin procedure.

33. The computer-controlled apparatus of claim 32, wherein the computer storage medium has further computer-executable instructions stored thereon which, when executed by the central processing unit, will cause the apparatus in response to determining that there are pending read or write requests that can be satisfied to:

determine whether any requests are waiting on the provision level lock; and in response to determining that requests are waiting on the provision level lock, to prioritize the request for the provision level lock.

* * * * *